(12) United States Patent
Hackel et al.

(10) Patent No.: US 12,203,729 B2
(45) Date of Patent: Jan. 21, 2025

(54) MISSILE, IN PARTICULAR GUIDED MISSILE, HAVING A RADAR SENSOR UNIT

(71) Applicant: Diehl Defence GmbH & Co. KG, Ueberlingen (DE)

(72) Inventors: Martin Hackel, Ueberlingen (DE); Volker Koch, Rueckersdorf (DE); Thomas Bertuch, Bonn (DE); Claudius Loecker, Bonn (DE); Thomas Vaupel, Wachtberg (DE)

(73) Assignee: Diehl Defence GmbH & Co. KG, Ueberlingen (DE)

( * ) Notice: Subject to any disclaimer, the term of this patent is extended or adjusted under 35 U.S.C. 154(b) by 983 days.

(21) Appl. No.: 17/176,231

(22) Filed: Feb. 16, 2021

(65) Prior Publication Data

US 2021/0262763 A1      Aug. 26, 2021

(30) Foreign Application Priority Data

Feb. 21, 2020   (DE) .......................... 102020001153.5

(51) Int. Cl.
  *F41G 7/22*       (2006.01)
  *G01S 7/03*       (2006.01)
  *H01Q 1/28*       (2006.01)

(52) U.S. Cl.
  CPC ......... *F41G 7/2246* (2013.01); *F41G 7/2286* (2013.01); *G01S 7/032* (2013.01); *H01Q 1/28* (2013.01)

(58) Field of Classification Search
  CPC ...... F41G 7/2246; F41G 7/2286; G01S 7/032; H01Q 1/28–287
  See application file for complete search history.

(56) References Cited

U.S. PATENT DOCUMENTS

| | | | | |
|---|---|---|---|---|
| 3,699,574 A | * | 10/1972 | O'Hara | H01Q 3/32 343/705 |
| 3,903,523 A | * | 9/1975 | Hartley, Jr. | H01Q 13/20 102/214 |
| 3,908,933 A | | 9/1975 | Goss et al. | |
| 4,162,499 A | * | 7/1979 | Jones, Jr. | H01Q 9/0414 343/708 |
| 5,220,330 A | * | 6/1993 | Salvail | H01Q 13/085 343/705 |
| 5,473,331 A | | 12/1995 | Kennedy et al. | |
| 6,388,610 B1 | | 5/2002 | Przyjemski et al. | |
| 6,771,218 B1 | * | 8/2004 | Lalezari | H01Q 1/28 342/373 |

(Continued)

FOREIGN PATENT DOCUMENTS

| | | |
|---|---|---|
| DE | 3145374 A1 | 6/1983 |
| DE | 19645496 A1 | 5/1998 |

(Continued)

*Primary Examiner* — Matthew M Barker
(74) *Attorney, Agent, or Firm* — Laurence A. Greenberg; Werner H. Stemer; Ralph E. Locher

(57) ABSTRACT

A missile, in particular a guided missile, has a missile body and a radar sensor unit for acquiring a target object. The radar sensor unit contains at least one radar antenna, strip-shaped in the longitudinal direction, that is mounted or integrated on a circumferential surface of the missile body such that the longitudinal direction of the at least one strip-shaped radar antenna is aligned in the direction of the missile longitudinal axis.

14 Claims, 10 Drawing Sheets

(56) References Cited

U.S. PATENT DOCUMENTS

| | | |
|---|---|---|
| 6,965,342 B2 | 11/2005 | Klausing et al. |
| 9,244,155 B2 | 1/2016 | Bielas |
| 9,719,924 B1 | 8/2017 | Stratis et al. |
| 2001/0013565 A1* | 8/2001 | Davidovitch ......... F41G 7/2213 244/3.15 |
| 2003/0038752 A1* | 2/2003 | Park ..................... H01Q 25/008 343/757 |
| 2005/0012655 A1* | 1/2005 | Lalezari ................ H01Q 25/02 342/368 |
| 2008/0258065 A1 | 10/2008 | Banks |
| 2011/0102245 A1* | 5/2011 | Williams ........... H01Q 15/0086 356/138 |
| 2012/0166073 A1 | 6/2012 | Poirier et al. |
| 2016/0084623 A1* | 3/2016 | Facciano ............... F41G 7/2253 342/372 |
| 2017/0301991 A1* | 10/2017 | Stratis ..................... H01Q 1/42 |
| 2018/0123229 A1 | 5/2018 | Stratis et al. |
| 2019/0067806 A1* | 2/2019 | Xu ........................ H01Q 1/422 |

FOREIGN PATENT DOCUMENTS

| | | |
|---|---|---|
| DE | 69515790 T2 | 11/2000 |
| DE | 102016005912 A1 | 11/2017 |
| EP | 0391634 A1 | 10/1990 |
| EP | 0720210 A2 | 7/1996 |
| EP | 2109184 A1 | 10/2009 |
| EP | 1382085 B1 | 12/2011 |
| EP | 2673656 A2 | 12/2013 |
| EP | 3221921 A1 | 9/2017 |
| FR | 2445042 A1 | 7/1980 |
| GB | 2151428 A | 7/1985 |
| WO | 02088770 A2 | 11/2002 |
| WO | 2012109016 A2 | 8/2012 |
| WO | 2016081058 A1 | 5/2016 |
| WO | 2016133715 A1 | 8/2016 |
| WO | 2019155456 A1 | 8/2019 |

* cited by examiner

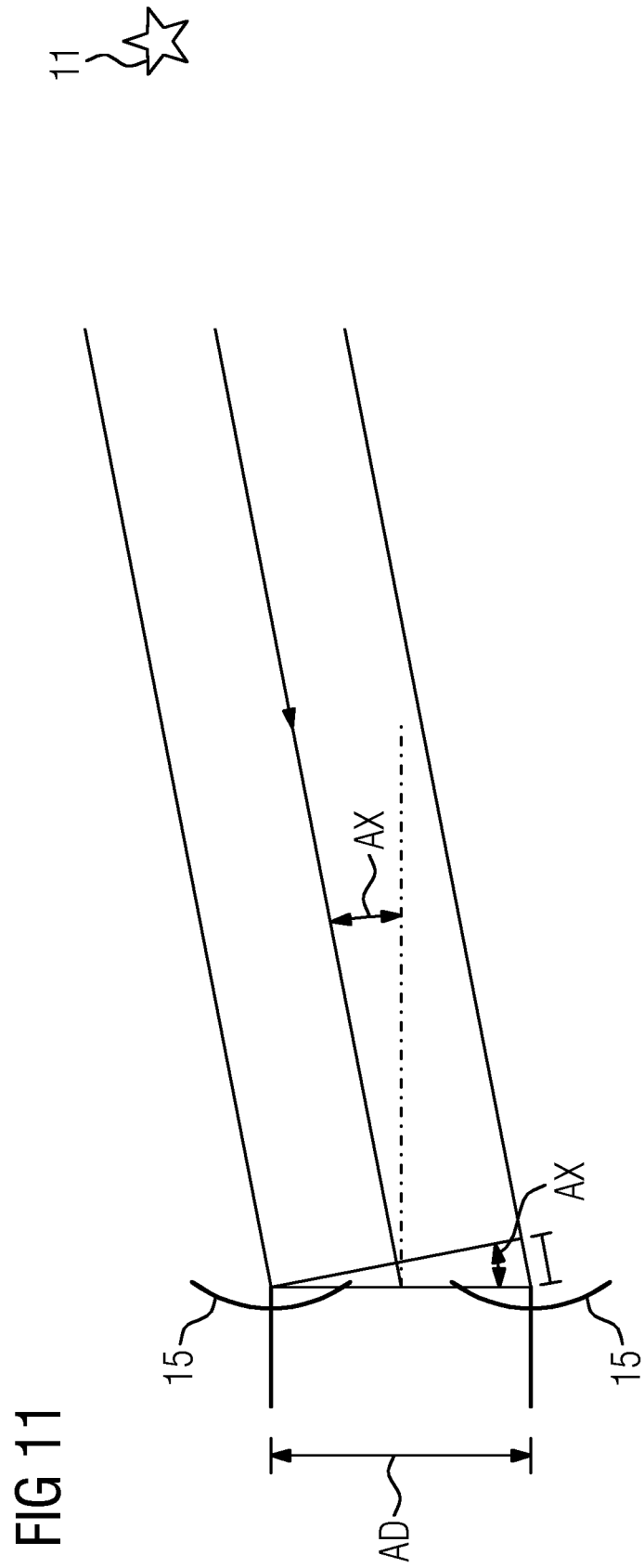

MISSILE, IN PARTICULAR GUIDED MISSILE, HAVING A RADAR SENSOR UNIT

CROSS-REFERENCE TO RELATED APPLICATION

This application claims the priority, under 35 U.S.C. § 119, of German patent application DE 10 2020 001 153.5, filed Feb. 21, 2020; the prior application is herewith incorporated by reference in its entirety.

BACKGROUND OF THE INVENTION

Field of the Invention

The underlying invention relates to a missile, in particular a guided missile, having a radar sensor unit designed for target acquisition.

The prior art discloses for example weapon guidance systems that use radar sensors to guide a weapon to a target. Such a weapon guidance system is known from German patent DE 695 15 790 T2 (corresponding to U.S. Pat. No. 5,473,331), for example, according to which a firing platform is equipped with a radar device having a synthetic aperture. The radar device of the firing platform can be used to map out the area surrounding a target, and the location of the target can be determined from the mapping. The location of the target that is determined by the radar device of the firing platform is taken as a basis for flying the weapon to the target.

Published, non-prosecuted German patent application DE 31 45 374 A1 discloses a method that can be used to combat ground targets by a missile. The missile has a middle-phase seeker head and final-phase seeker head, wherein a radar seeker head is used to coordinate multiple targets in the middle phase and to determine an approach course for the final phase by target selection. The radar seeker head operates according to the synthetic aperture principle, with surfaces being scanned transversely with respect to the flying direction in the middle phase and individual points on the scanned surface being resolved on the basis of the Doppler history.

International patent disclosure WO 02/088770 A2, corresponding to U.S. Pat. No. 6,965,342, discloses a method for detecting and identifying objects for missiles. The method involves the surroundings of the missile being scanned by means of a radar device operating according to the synthetic aperture principle, the radar device containing a multiplicity of antenna elements that are mounted along the curved missile contour of the missile tip.

Although the known methods allow target control for a missile, it is nevertheless desirable to improve the accuracy of target navigation and target guidance and the accuracy of target detection, while simultaneously allowing simple implementation of a radar sensor unit.

BRIEF SUMMARY OF THE INVENTION

In light of this, it is an object of the invention to provide a missile, in particular a guided missile, that allows improved target guidance and/or target detection, in particular given simultaneously comparatively simple implementation of radar sensor units for target acquisition. Furthermore, it can be regarded as an object of the invention to provide a missile that affords advantages in respect of the functionalization of the missile body.

This object is achieved in particular by the features of the independent claims. Variants of the invention are obtained from the dependent claims and from the description of variants and illustrative embodiments that follows.

According to some variants there is provision for a missile, in particular a guided missile.

The missile contains a missile body and a radar sensor unit for acquiring a target object, i.e. a radar sensor unit configured to acquire a target object.

The term missile body is intended here to describe in particular one or more main components of the missile independently of a possible specific functionalization. Applicable main components comprise, by way of example and non-exhaustively, outer skin and outer wall/s or parts thereof, and also missile segments relating to a drive unit of the missile, a missile tip or nose and a guidance unit of the missile.

The radar sensor unit contains at least one radar antenna that is strip-shaped in the longitudinal direction, i.e. the radar sensor unit contains at least one radar antenna that is in strip-shaped form in its longitudinal direction. The term "strip-shaped" is intended here to be understood, in particular in its general meaning, in the sense of long, narrow and ribbon-like. A corresponding strip-shaped radar antenna therefore has a length that is significantly greater, in particular substantially greater, than its width.

The at least one strip-shaped radar antenna is in particular configured such that it can be used in combination with appropriate control and evaluation electronics to acquire a target object, to detect the target object and if appropriate to track the target object in the field of view of the radar sensor unit. Furthermore, the radar sensor unit is configured to adapt the alignment of the field of view for the purpose of target acquisition.

The target object can be for example a target object to which the missile is intended to be guided or navigated, the target object being able to be e.g. a stationary or moving ground-, air- or water-based object.

The strip-shaped radar antenna (subsequently also referred to as radar antenna for short) is mounted or integrated on a circumferential surface of the missile body. The radar antenna may be mounted atop or on an outer skin or outer shell of the missile or missile body. It is also possible for, at least sections or part of, the radar antenna to be integrated in the outer skin or outer shell of the missile, for example in an outer skin section or in an outer wall of the missile. The outer skin section can form e.g. a one-piece segment of the outer skin of the missile. In some variants, the radar antenna may be in the form of a substrate-integrated radar antenna, with for example an outer skin section of the missile being able to serve as substrate for the integration.

The at least one strip-shaped radar antenna is mounted or integrated such that the longitudinal direction of the at least one strip-shaped radar antenna is aligned in the direction of the missile longitudinal axis, in particular runs in the direction of the missile longitudinal axis. If there are multiple radar antennas present, all of the radar antennas may be aligned accordingly, i.e. the longitudinal direction of each of the radar antennas is aligned in the direction of the missile longitudinal axis, i.e. so as to correspond to the missile longitudinal axis.

The wording "aligned in the direction of the missile longitudinal axis" is intended here to be understood to mean that the direction vector defined by the longitudinal direction of the strip-shaped radar antenna comprises a breakdown containing a component parallel to the missile longitudinal axis.

In some variants the strip-shaped radar antenna may be mounted or integrated such that the longitudinal direction of the strip-shaped radar antenna and the missile longitudinal axis span a plane. In a special case, the longitudinal direction of the strip-shaped radar antenna may be substantially parallel, in particular substantially genuinely parallel, to the missile longitudinal axis. In another arrangement of the strip-shaped radar antenna there may be provision for an intermediate angle between the longitudinal axis defined by the longitudinal direction of the strip-shaped radar antenna and the missile longitudinal axis to be an acute angle.

In the case of a substantially genuinely parallel arrangement of the radar antenna with respect to the missile longitudinal axis the radar antenna may be mounted or integrated for example on or in a segment of the missile body that is cylindrical with respect to the missile longitudinal axis. In an arrangement with an acute intermediate angle as described above the radar antenna may be mounted or integrated for example on or in a segment of the missile body that runs conically or in cone-like fashion with respect to the missile longitudinal axis.

The wordings used herein in regard to properties of the at least one radar antenna are intended to be understood to mean in particular that respective properties apply or may exist in the case of or for all available radar antennas of the radar sensor unit, unless stated otherwise.

According to some variants the at least one radar antenna may be configured and arranged so as to be substantially parallel to the missile longitudinal axis in the longitudinal direction of the radar antenna. Such a variant is possible for example if the segment or the area of the missile body on or in which the radar antenna is mounted or integrated runs parallel to the missile longitudinal axis, and parallel mounting or integration of the radar antenna is accordingly possible. The wording "substantially parallel" is intended to be understood to mean in particular that the orientation is parallel apart from customary manufacturing tolerances.

However, in some variants it is also possible to mount or integrate the radar antenna for example on or in a segment of the missile body that runs conically with respect to the missile longitudinal axis.

According to some variants the radar antenna is in planar form in the longitudinal direction of the radar antenna, i.e. in substantially uncurved form with respect to the longitudinal direction. By way of example, the radar antenna may be formed on or in an area, in particular a surface, of the missile body that is planar in the longitudinal direction of the radar antenna. In other words, the radar antenna may be mounted or integrated on or in an area, in particular on or in a surface, that is substantially planar, i.e. is substantially not curved, in the longitudinal direction of the radar antenna at least over the longitudinal extent of the radar antenna. A corresponding surface may be formed for example by a cylindrical segment of the missile body, and in particular may run in the direction of the missile longitudinal axis, for example parallel to the missile longitudinal axis.

According to some variants the at least one radar antenna is configured as a transmitting antenna and/or receiving antenna. This means that, in one variant, one or more of the at least one radar antenna is/are configured either just for operation as a transmitting antenna or just for operation as a receiving antenna. However, it is also possible for one or more of the at least one radar antenna to be configured for alternate operation as a transmitting antenna and receiving antenna.

The proposed radar sensor unit allows a missile, for example a guided missile, to be equipped with a radar sensor system that is able to be used for target acquisition, with associated radar sensors being able to be arranged in an otherwise non-functionalized region of the perimeter of the missile body. The missile tip can therefore be functionalized substantially freely. By way of example, it is possible to dispense with the target acquisition sensor system integrated in the missile tip in known guided missiles and to functionalize the missile tip in another way, e.g. with a warhead. However, it is also possible to provide a further target capture sensor system in addition to the proposed radar sensor unit at the missile tip and to use appropriate sensor data additionally for target acquisition and target tracking and also for target navigation, which allows the accuracy and reliability of the target acquisition, target tracking and target navigation to be improved.

Furthermore, the proposed radar sensor unit provides the opportunity to retrofit a radar sensor system in missiles without having to dispense with customary functionalizations, for example an infrared seeker head or a combat unit, in the missile tip.

Furthermore, the radar antenna of the radar sensor unit, which is strip-shaped in the longitudinal direction, can be mounted or integrated in or on the circumferential surface in a particularly advantageous manner in respect of aerodynamics of the missile, which affords advantages in respect of aerodynamics over other mounting locations on the missile body.

According to some variants the at least one radar antenna is configured for operation as a transmitting antenna for transmitting radar signals and/or for operation as a receiving antenna for receiving reflected radar signals. Accordingly the radar antenna may be configured as a pure transmitting antenna, may be configured as a pure receiving antenna or may be configured as a transmitting/receiving antenna, i.e. as an antenna configured for selective use as a transmitting antenna and a receiving antenna.

According to some variants the radar sensor unit can have multiple, but at least two, of the strip-shaped radar antennas that are mounted or integrated on the circumferential surface of the missile body. The two or more radar antennas may be of substantially identical design. In particular the radar antennas can have substantially the same length as seen in the longitudinal direction of the radar antennas.

Two or more of the radar antennas may be arranged so as to be aligned substantially parallel to one another in some variants. The longitudinal axes of the respective radar antennas can run parallel to one another in this case, the longitudinal axes as such being in turn able, but not having, to run parallel to the missile longitudinal axis, for example if the circumferential surface runs conically.

In some variants two or more radar antennas, preferably all radar antennas, can have substantially the same length as seen in the longitudinal direction of the radar antennas. The radar antennas may be mounted or integrated parallel to the missile axis, for example without an offset. Alternatively the radar antennas may be arranged in a manner offset from one another, for example in order to reduce crosstalk by a transmitted signal of a radar antenna operated as a transmitting antenna onto a radar antenna operated as a receiving antenna. Applicable radar antennas with identical alignment and an arrangement that is offset or not offset in the longitudinal direction can be combined to form radar antenna groups.

Such radar antenna groups, but also individual radar antennas, may for example each be mounted or integrated on a support element. Such a support element may be for example a component that forms part of the missile outer skin after assembly. When corresponding support elements are used, respective radar antennas may be in substrate-integrated form, in particular such that the radar antennas are situated on an outer side of the missile body after the support element is mounted on the missile body. On the inner side of the support element, which is remote from the outer side, there may be provision for connection interfaces for connecting the radar antennas for signal-transmission and control purposes to one or more assigned electronics units for controlling the radar antennas and/or for evaluating received signals.

The radar antennas may be mounted or integrated in particular such that they extend over the same segment of the missile body as seen in the direction of the missile longitudinal axis. By way of example the radar antennas may be mounted or integrated on the circumference of a cylindrical outer wall.

The applicable two or more radar antennas, in particular the radar antennas of a radar antenna group, may, as already indicated earlier on, be configured for operation as transmitting and/or receiving antennas.

According to some variants the radar sensor unit can comprise at least one radar antenna group having two or more radar antennas. At least one of the at least one radar antenna group can comprise a first radar antenna configured for operation as a transmitting antenna and can comprise at least one, preferably multiple, in particular at least two or three, second radar antennas, assigned to the first radar antenna, that is/are configured for operation as receiving antennas for receiving reflected radar signals. The reflected radar signals can be based on radar signals of the first radar antenna of the radar antenna group or of another radar antenna, configured as a transmitting antenna, of another radar antenna group. Applicable radar antenna groups may be arranged in a manner distributed, in particular evenly distributed, over the circumference of the missile body.

A functional arrangement and combination of radar antenna groups may be advantageous, in particular in respect of mounting or integration in or on the missile body, for example if such radar antenna groups are mounted or integrated on a common support element, e.g. a support plate as part of the outer shell of the missile body.

According to some variants the radar antennas may be arranged in a manner distributed in the circumferential direction with respect to the missile longitudinal axis. By way of example it is possible to arrange multiple radar antenna groups in a manner distributed over the circumference of the missile body, e.g. according to an even distribution in the circumferential direction and/or according to a stipulated symmetry. When the arrangement has a suitable distribution or symmetry in the circumferential direction it is possible for example to implement a radar sensor unit that, viewed as a whole, has a field of view with a comparatively wide vertex angle in the circumferential direction with respect of the missile longitudinal axis, also referred to as the azimuth direction.

According to some variants, the radar sensor unit is configured to emit radar signals or radar radiation having at least one stipulated radar wavelength and comprises at least two directly adjacent strip-shaped radar antennas that are configured at least for operation as receiving antennas, wherein a distance between the directly adjacent strip-shaped radar antennas configured for operation as receiving antennas transversely, in particular perpendicularly, with respect to the longitudinal direction of the radar antennas is at most as great as a or a multiple of the radar wavelength. By way of example the distance may be in the order of magnitude of the radar wavelength. In particular the distance may be in the region of one or two times the radar wavelength. A corresponding arrangement of the receiving antennas can be used to achieve in particular an advantageous resolution in the circumferential direction, i.e. in the azimuth direction.

According to some variants, at least one of the radar antennas is configured and operable such that it has an antenna radiation pattern that is able to be directed over the polar angle, i.e. an antenna main lobe that is able to be directed over the polar angle. By way of example a corresponding radar antenna may be in the form of a strip-shaped leaky wave antenna whose antenna radiation pattern is alignable over the polar angle e.g. by adapting the frequency.

According to some variants the radar antenna may be configured in particular such that the vertex angle, i.e. the half-power beamwidth, of the antenna main lobe, in particular of the antenna main lobe at the transmission end, or the −3 dB beamwidth, is 30 degrees or less than 30 degrees over the polar angle in the defined range.

According to some variants, the radar antenna may be configured in particular such that the vertex angle, i.e. the half-power beamwidth, is 30 degrees or greater than 30 degrees over the azimuth angle in the defined range.

Radar sensor units configured in this manner result in a comparatively narrow acquisition range over the polar angle and in a comparatively wide acquisition range over the azimuth angle, which allow comparatively accurate ascertainment of polar and azimuth angles for a target object, which is discussed more thoroughly later on.

In connection with the preceding variants that relate to polar angle (theta) and azimuth angle (phi), these angles are understood with reference to a spherical coordinates system whose polar axis runs in the direction of the longitudinal axis of the particular strip-shaped radar antenna/s under consideration, preferably parallel to the missile longitudinal axis, with the positive polar axis facing the missile tip. If the polar axis is parallel to the missile longitudinal axis then the polar axis vector of the positive polar axis is parallel to the missile longitudinal axis and runs parallel to the direction that points towards the missile tip with respect to the missile longitudinal axis.

According to some variants the at least one radar antenna may be in the form of a radar antenna that is alignable over the polar angle by means of the frequency or by means of the phase. A corresponding radar antenna is configured in particular such that the alignment of the antenna main lobe—especially the transmission-end antenna main lobe—of the radar antenna is adjustable with respect to the polar angle by means of the operating frequency or the phase.

A corresponding radar antenna configured and operable as a transmitting antenna may be in the form of a leaky wave antenna, for example, that allows adjustment of the polar angle of the antenna main lobe by means of the frequency, for example.

Furthermore, it is possible for a corresponding radar antenna to be configured and designed as a phase-controlled group antenna that allows adjustment of the polar angle of the antenna main lobe by means of the phase.

Leaky wave antennas and phase-controlled group antennas are widely known in the prior art and are therefore not described in detail.

Radar antennas having antenna main lobes that are adjustable or alignable over the polar angle firstly allow alignment of the field of view of the radar sensor unit in the direction of a target object with a known position and secondly allow scanning of the surroundings in the polar angle direction in order to ascertain the polar angle of an acquirable target object or of an already acquired target object.

According to some variants the missile additionally comprises an electronics unit, in particular control and evaluation electronics, for the radar sensor unit. The electronics unit, in particular the control and evaluation electronics, is connectable or connected to the radar sensor unit for data transmission purposes and in particular for signal transmission purposes in order to operate said radar sensor unit, in particular in order to control the operation of the radar sensor unit.

The electronics unit comprises one or more electronic components that are configured such that during the operation of the electronics unit they operate the at least one radar antenna as a transmitting antenna and/or a receiving antenna.

The electronics unit and/or the at least one radar antenna may be configured in particular such that the operation thereof results in at least one of the method or operating steps described below being carried out.

The electronic components can comprise for example one or more circuit components, one or more permanently programmable computer or control units having instructions stored thereon and/or one or more non-permanently programmable computer or control units having one or more assigned nonvolatile memories having instructions stored thereon. The operation of the circuit components and/or execution of the instructions by the respective computer or control unit/s causes the respective method or operating steps to be carried out.

According to some variants a method or operating step can involve a transmitting channel of transmitting electronics, in particular of a transmitting electronics assembly of the control electronics, being connected to at least one radar antenna operable as a transmitting antenna. Furthermore, a receiving channel of receiving electronics, in particular of a receiving electronics assembly, can be connected to at least one radar antenna operable as a receiving antenna. The radar antenna/s operable as transmitting antenna/s and the radar antenna/s operable as receiving antenna/s can preferably be connected to transmitting and receiving channels, and operated, such that the radar sensor unit is operable with an antenna main lobe, in particular has an antenna main lobe at the transmission end, that is alignable or directed in the direction of the target object, i.e. in the direction of the detectable target object.

To adjust the antenna main lobe it is possible to use for example target object data, e.g. in the form of data pertaining to the position, velocity and acceleration of the target object. If these target object data are not yet known to the missile, i.e. the missile controller, for example because it has not yet been possible to acquire the target object using on-missile target acquisition sensors, then corresponding target object data can be obtained from an external unit, for example an external, off-missile sensor unit, or elsewhere on the basis of data in the form of prior knowledge pertaining to the target object. The externally ascertained target object data can be transmitted to the missile by wired or wireless data transmission, for example by means of wireless data transmission during the flight of the missile, or before the missile is fired, and can be received by the missile. Data pertaining to the target object can also be obtained by scanning space by means of the radar sensor unit using a suitable search strategy, for example if no target object data are available from external units. The search strategy can involve for example the alignment of the antenna main lobe being changed according to a stipulated scheme, in particular algorithm.

According to one variant a method or operating step can comprise: actuating the at least one radar antenna to align the respective antenna main lobe, in particular in the polar direction, with a detected or detectable target object. Alignment in the polar direction can involve the use of already available target object data, in particular prior knowledge pertaining to the target object. If target object data are already known to the missile radar sensor from its own target acquisition, these data can be used to align the antenna main lobe(s). Adjustment of the polar direction of the antenna main lobe/s can, as already described, be effected in the case of a sweepable-frequency radar antenna by varying the frequency. In the case of sweepable-phase radar antennas it is possible for adjustment of the polar direction to be achieved by means of appropriate phase-controlled operation of the radar antennas.

According to some variants it is possible, as already indicated, for the alignment of the antenna main lobe(s) for e.g. an as yet undetected target object, for example a target object that is not yet detectable or detected in the field of view of the radar sensor unit, to be varied on the basis of target object data that are provided to the missile, in particular to appropriate control units, by external data sources or that are or have been generated by the radar sensor unit by scanning space.

Varying the alignment of the antenna main lobes allows the surroundings, in particular the respective spatial segment scannable by means of the radar sensor unit, to be progressively scanned for a target object. Scanning can involve for example the use of a stipulated search strategy to vary the alignment of the antenna main lobe/s of the radar antennas. The spatial segment can be scanned using in particular target object data that e.g. contain or indicate an approximate position of a target object.

According to some variants the missile may be configured, for example by means of appropriate configuration of the missile controller and the radar sensor unit, such that spatial segments in the whole front half-space with reference to the missile tip can be scanned by means of appropriate actuation of the radar antennas and/or control of the missile.

According to some variants one method or operating step can comprise varying the alignment of the antenna main lobe/s of one or more radar antennas in successive detection cycles. Furthermore, in this context, one method and operating step can comprise ascertaining position data pertaining to the target object, in particular polar angle data of the target object, with reference to an on-missile (spherical) coordinate system, by means of amplitude comparison of the reflected radar signals detected in successive detection cycles.

According to some variants one method or operating step can comprise simultaneously detecting a reflected radar signal, i.e. a reflection signal, for a radar signal transmitted by a radar antenna operated as a transmitting antenna. The reflection signal is simultaneously detected by means of adjacent, in particular directly adjacent in the circumferential direction, i.e. transversely with respect to the longitudinal direction of the radar antennas, radar antennas operated as receiving antennas. Based on the simultaneously detected reflection signal it is possible for a further method and operating step to comprise ascertaining position data pertaining to the target object. The position data are preferably azimuth angle data of the target object with reference to an on-missile (spherical) coordinate system. The position data pertaining to the target object, in particular the azimuth angle data, are ascertained from the simultaneously detected reflection signal, preferably by means of phase and/or amplitude comparison. In particular the reflection signals simultaneously received by different receiving antennas spaced apart in the circumferential direction contain information about reflecting objects with respect to the azimuth direction. This information can be used to ascertain the azimuth direction of a target object.

According to some variants it is possible for a method or operating step to be configured to ascertain the distance, for example by means of time-of-flight effects of the radar signals, and/or the approach velocity of the target object, e.g. by means of Doppler effects, on the basis of received radar signals.

Appropriate operation of the control and evaluation electronics therefore allows target object data, for example containing position data and/or velocity data of the target object, to be ascertained with reference to an on-missile (spherical) coordinate system. During ascertainment of the target object data it is possible, as described, for the alignment of the antenna main lobe over the polar angle, and the information pertaining to the azimuth angle, the distance and the velocity of the target object that is contained in the received reflected radar signals, to be evaluated and used for target acquisition and/or target navigation.

The target object data ascertained by means of the radar sensor unit can be combined on the basis of target object data of an external sensor unit and/or on the basis of target object data of an on-missile further target acquisition unit, which may be integrated in the missile tip, for example, as an optical or infrared-based target acquisition unit, which allows in particular the target acquisition and/or target navigation to be improved.

According to some variants the electronics unit can comprise at least one transmitting channel and the electronics unit can comprise one or more, in particular at least two, receiving channels.

The electronics unit may be configured to connect the at least one transmitting channel to a radar antenna operable as a transmitting antenna and operable with an antenna main lobe that is alignable in the direction of the target object and to connect the at least one receiving channel to a radar antenna operable as a receiving antenna in order to capture the radar signals reflected by the target object. The target object data described earlier on pertaining to the distance, the polar angle, the azimuth angle, the velocity and/or the acceleration of the target object can therefore be ascertained, on the basis of the radar sensor unit proposed herein that is mounted or integrated on a circumferential surface of the missile body. If necessary it is possible for the ascertainment of the target object data to be based solely on the data ascertained by the radar sensor unit, which allows a missile tip otherwise fitted with optical or infrared-based target acquisition sensor units to be functionalized in another way.

According to some variants the circumferential surface on which the at least one strip-shaped radar antenna is mounted or integrated may be in substantially planar form, in particular in non-curved form with respect to the longitudinal axis of the radar antenna and/or with respect to the missile longitudinal axis, in the longitudinal direction of the radar antenna, preferably also in the direction of the missile longitudinal axis. The circumferential surface may be in particular in cylindrical form. By way of example the radar antenna or the radar antennas of the radar sensor unit may be mounted or integrated over the circumference of a cylindrical outer wall that is concentric with the missile longitudinal axis.

The circumferential surface may be situated in a region of a guidance section of the missile body in which a guidance and control unit of the missile is arranged, for example in a segment of the missile body between the missile tip or nose and the drive end of the missile. In this context it should be mentioned that the missile can comprise a drive unit remotely from the missile tip that can have a drive and multiple guide flaps and control vanes for directional control, for example.

The guidance section can comprise one or more computer units for flight, motion and drive control and/or for flight and target navigation.

Furthermore, the electronics unit for operating the radar sensor unit may be accommodated in the region of the guidance section, wherein at least some of the electronics unit and/or electronic components of the electronics unit may be implemented in conjunction with one or more computer units of the guidance unit. The computing unit/s and/or electronics unit may, as already mentioned, be designed and configured to generate these control signals to radiate radar signals, i.e. radar radiation. Furthermore, the computing unit/s and/or electronics unit may be designed and configured to receive reflected radar signals, i.e. radar radiation, and to process corresponding received data. In particular the computing unit/s and/or electronics unit may be configured to evaluate the received radar radiation to determine whether a or the target object is situated in the field of view of the radar sensor unit.

On the basis of the evaluation of the received radar radiation the computing unit/s and/or electronics unit can ascertain, in particular calculate, further control signals for flight control and/or for adjusting operating parameters of the radar sensor unit.

The operating parameters of the radar sensor unit can comprise in particular operating parameters that can be used to adjust the modulation of the radar sensor unit, the alignment of the antenna main lobe/s and/or the vertex angles of the antenna main lobe(s).

Furthermore, the operating parameters can comprise operating parameters that relate to the acquisition of radar radiation, for example whether radar radiation is acquired just from one or from multiple radar antennas simultaneously.

Furthermore, the operating parameters can comprise operating parameters that define whether and when a radar antenna is operated as a transmitting antenna or a receiving antenna in a detection cycle.

The radar sensor unit may therefore be configured to be operable such that it can acquire one or more target objects on the basis of radar radiation, i.e. radar signals.

The operating parameters for operating the radar sensor unit can be ascertained on the basis of target object data, for example pertaining to the position, the velocity, the alignment and the acceleration of the target object, on the basis of missile data, for example pertaining to the position, the velocity, the alignment and the acceleration of the missile, and/or on the basis of the data of the radar sensor unit from preceding detection cycles.

At least in an initial flight phase, for example after the missile is fired, in which there are not yet any on-missile data available for the target object data, it is possible for data pertaining to the target object, such as for example position, velocity and acceleration, to be received by the missile from an external unit, evaluated and used for flight control and for adjusting the operating parameters of the radar sensor unit.

The external unit can be for example a firing or monitoring unit of a weapon system assigned to the missile.

Following acquisition of a target object by means of the on-missile radar sensor unit, and if necessary using a further on-missile target acquisition sensor, respective target object data can be used to control the operation of the radar sensor unit, to control the flight of the missile and/or to navigate the missile. It is possible for external target object data and/or missile data to be taken into consideration in such flight phases, however.

In particular the target object data ascertained for the target object by the radar sensor unit can be taken as a basis for adaptively adjusting the movement of the missile along a trajectory and the operating data of the radar sensor unit on the basis of the target object data.

The adaptive adjustment of the operating parameters of the radar sensor unit can be performed for example in respect of an ability to acquire distance, polar angle and azimuth angle of the target object, and in respect of a particular optimum signal-to-noise ratio and other relevant detection properties of the radar sensor unit, such as e.g. detection power, target contrast, etc. The computing unit(s) and/or electronics unit may be appropriately configured and programmed or programmably configured for this purpose.

The wording "adaptively adjust" is intended to be understood to mean in particular that the operating parameters are adapted or altered on the basis of the situation, with situation-based adaptation being effected at least on the basis of information pertaining to the target object, i.e. at least on the basis of the target object data. In particular the term "adaptive" is intended to be understood to mean that the trajectory and the operating data are each adjusted in reaction to changes in the target object data. Adaptive adjustment of the operating parameters allows in particular the detection characteristic of the radar sensor unit, in particular the transmission and reception characteristic of the radar sensor unit, to be adjusted such that the target object can be reliably detected and that the position and coordinates thereof, containing for example polar angle, azimuth angle and distance, and possibly further target object data can be reliably ascertained.

When the radar antennas are arranged in the region of the guidance section, or more generally in a missile segment in which the electronic components for missile control are accommodated, it is possible to provide comparatively short signal and control lines, which allows susceptibility to interference to be reduced, for example.

The radar sensor unit can have one or more radar sensor assemblies and/or may be in the form of a single assembly, which is/are configured for mounting on a missile body. By way of example a corresponding assembly may be in the form of a segment of the missile, with longitudinal-side connecting ends for connection and for mounting on further missile segments, for example between the missile tip and the drive end of the missile, in particular between the missile tip and a warhead of the missile that follows in the direction of the drive end. In this variant the missile is preferably a guided missile for combating target objects.

The radar antennas of the radar sensor unit are preferably mounted or integrated such that they terminate substantially flush with the circumferential surface of the missile, in particular such that substantially identical aerodynamic properties can be achieved compared to an otherwise identical missile without the radar antennas, in particular that substantially no aerodynamic disadvantages arise as a result of the mounting or integration of the radar antennas.

In the case of the mounting or integration of the radar sensors on or in a circumferential surface that is proposed here, the center axis or central or main axis of the field of view, in particular of the antenna main lobe, of the radar sensor unit can be aligned obliquely with respect to the missile longitudinal axis, with a non-zero polar angle. The center axis is preferably aligned with the front half-space with reference to the missile tip, and forms an intermediate angle that is less than 90 degrees, that is to say an acute intermediate angle therefore, with the direction pointing from the drive end of the missile to the missile tip.

BRIEF DESCRIPTION OF THE SEVERAL VIEWS OF THE DRAWING

FIG. 11 is an illustration showing the operation of the radar sensor unit to ascertain the azimuth angle of a target object by way of illustration.

DETAILED DESCRIPTION OF THE INVENTION

Figure 1:
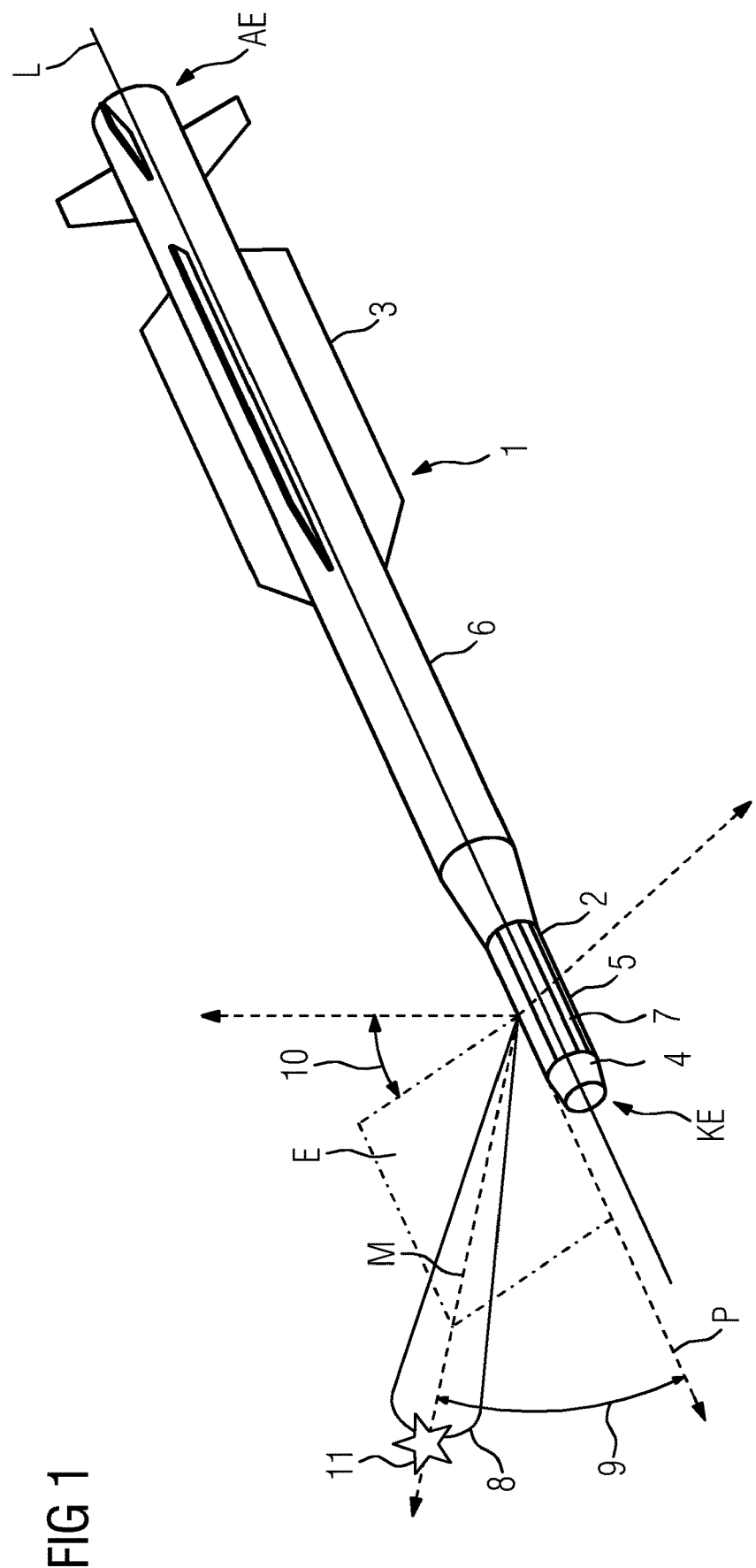
FIG. 1 is a diagrammatic, perspective view of a guided missile with a radar sensor unit according to the invention.

The following is a summary list of reference numerals and the corresponding structure used in the above description of the invention:

Referring now to the figures of the drawings in detail and first, particularly to FIG. 1 thereof, there is shown an exemplary embodiment of a guided missile 1 configured according to the invention with a radar sensor unit 2.

The guided missile 1, subsequently also called missile 1 for short, has a drive 3 that defines a drive end AE of the missile 1. At an end remote therefrom in the direction of the missile longitudinal axis L, i.e at a missile tip, the missile 1 has a missile head 4 that defines a head end KE. At the drive end AE the missile 1 has multiple fins, not denoted in more detail, for guidance and/or for stabilizing flight.

On a segment that follows the missile head 4 the missile 1 has a guidance section 5 in the direction of the drive end AE, the guidance section being followed towards the drive 3 by a warhead 6 by way of illustration. The design in the direction of the missile longitudinal axis L can differ from the design actually shown.

The guidance section 5 contains one or more computer and control units (not explicitly shown) for guiding the missile 1. Furthermore, electronic components of the radar sensor unit are accommodated in the region of the guidance section 5.

The radar sensor unit 2 contains multiple radar antennas 7 that are mounted and integrated on a circumferential surface that is planar in the direction of the missile longitudinal axis L but cylindrically curved in the circumferential direction.

For aerodynamic reasons the radar sensors 7 are configured to be substantially flush with the circumferential surface.

The arrangement in the region of the guidance section 5 has the advantage in particular that short signal paths can be achieved between the radar antennas 7 and assigned electronic components of the radar sensor unit 2.

The radar antennas 7 are in strip-shaped form, wherein the longitudinal direction of the strip-shaped radar antennas 7 is aligned in the direction of the missile longitudinal axis L. In the present example the longitudinal direction of each of the radar antennas 7 is parallel to the missile longitudinal axis L.

During operation of the radar sensor unit 2 the strip-shaped radar antennas 7 aligned parallel to the missile longitudinal axis L can be used, given appropriately selected operating parameters, to produce antenna main lobes 8 that are focused in relatively narrow fashion over the polar angle 9 (theta), in particular over a defined polar angle range of the antenna main lobe 8. The defined polar angle range may be less than 30 degrees, for example.

The polar angle 9 in this case is defined with reference to an on-missile, right-handed spherical coordinate system whose origin lies e.g. in the center of the longitudinal direction of a radar antenna 7, and which has a polar axis P that is parallel to the longitudinal direction of the radar antenna 7. In the present example the polar axis P is also parallel to the missile longitudinal axis L. The positive polar axis direction is defined by the direction in which the radar antenna 7 runs from the drive end AE to the head end. The polar angle 9 is measured between the polar axis P and the center axis M of the antenna main lobe 8 of the radar antenna 7 in the polar angle direction. In the circumferential direction with respect to the polar axis P the azimuth angle 10 (phi) is accordingly defined as a rotation angle with respect to a plane E that runs parallel to the polar axis P and contains the polar axis P.

An accordingly aligned antenna main lobe 8 can therefore illuminate a spatial segment situated obliquely with respect to the missile longitudinal axis L in order to detect and acquire a target object 11.

Figure 2:
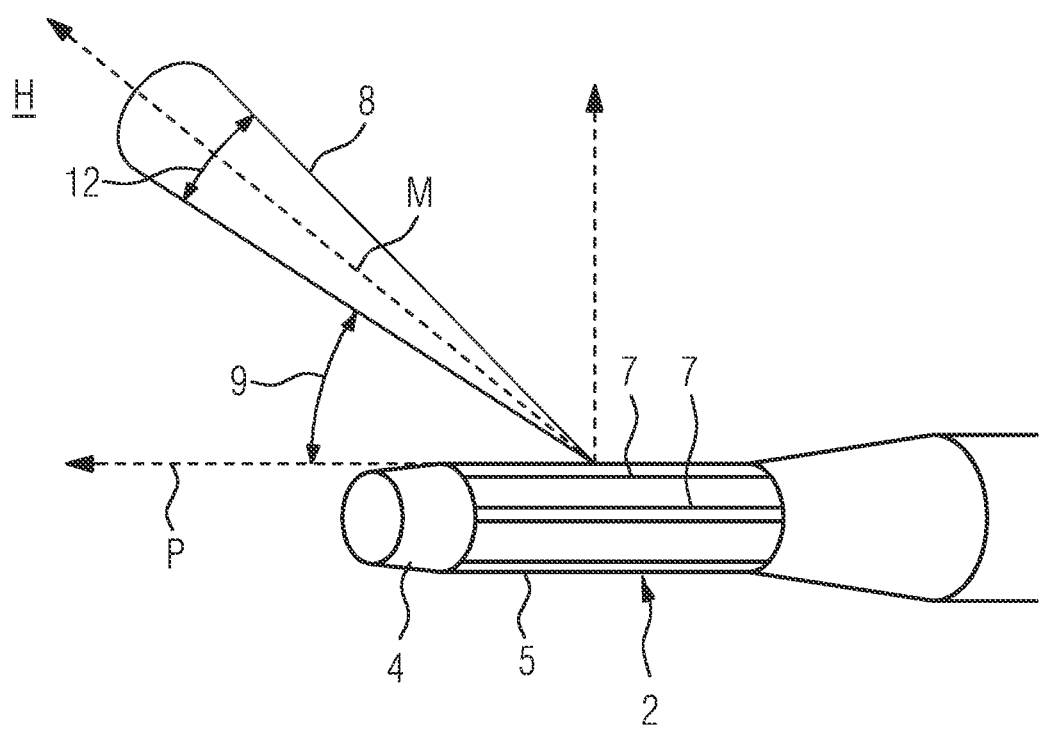
FIG. 2 is a side, perspective view of a section of the guided missile shown in FIG. 1.

FIG. 2 shows a side profile view of the guided missile 1 in the region of the head end KE with reference to the spherical coordinate system's polar main plane that runs through the polar axis P and the coordinate origin of the spherical coordinate system, in order to schematically clarify the alignment of the antenna main lobe 8. As can be seen from FIG. 2 the antenna main lobe 8 is rotated through a polar angle 9 relative to the polar axis P and is focused over a defined polar angle range in the polar main plane, i.e. over a defined polar vertex angle 12. The polar vertex angle 12 of the antenna main lobe 8 may be e.g. less than 30 degrees in the respective defined region of the antenna main lobe 8, for example depending on operating parameters of the radar sensor unit 2.

Depending on the operating parameters the polar angle 9 of the antenna main lobe 8 can be aligned with the front half-space H, the polar angle 9 being able to be adjusted for example between close to zero degrees and 90 degrees with respect to the front half-space H by means of appropriate operation of the radar antennas 7. In other words, appropriate operation of the radar antennas 7 can result in the antenna main lobe 8 being swivelled in the front half-space H in the cited angle range. Swivelling of the antenna main lobe 8 in the rear half-space can likewise be achieved given appropriate operation of the radar antennas 7, the illumination of the front half-space H principally being significant for the acquisition of a target object 11, for the tracking of a target object 11 and for the target navigation of the guided missile 1 to the target object 11.

Figure 3:
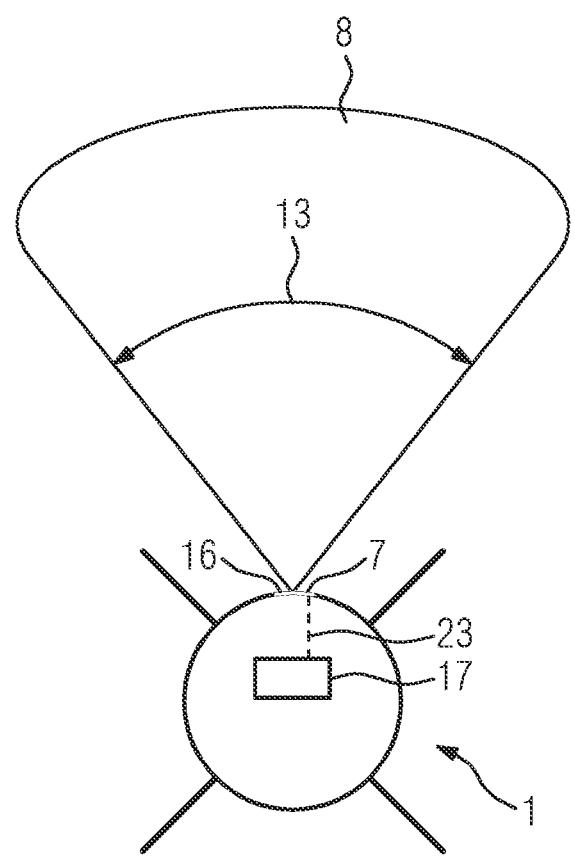
FIG. 3 is a front profile view of the guided missile shown in FIG. 1, at right angles to the side view of FIG. 2.

FIG. 3 shows a front profile view of the guided missile 1, at right angles to the side profile view of FIG. 2, with reference to the spherical coordinate system's azimuthal main plane that runs at right angles through the polar axis P and the coordinate origin. As can be seen from the schematic depiction of FIG. 3 the antenna main lobe 8 sweeps over an azimuth vertex angle 13 in the defined region of the antenna main lobe 8 in the azimuthal main plane, the azimuth vertex angle being able to be greater than 30 degrees, for example, depending on the operating parameters of the radar sensor unit 2.

Looking at FIG. 1 to FIG. 3 together reveals in particular that the antenna main lobe 8 is aligned to the side of the missile longitudinal axis L and can illuminate a corresponding lateral spatial region.

Figure 4:
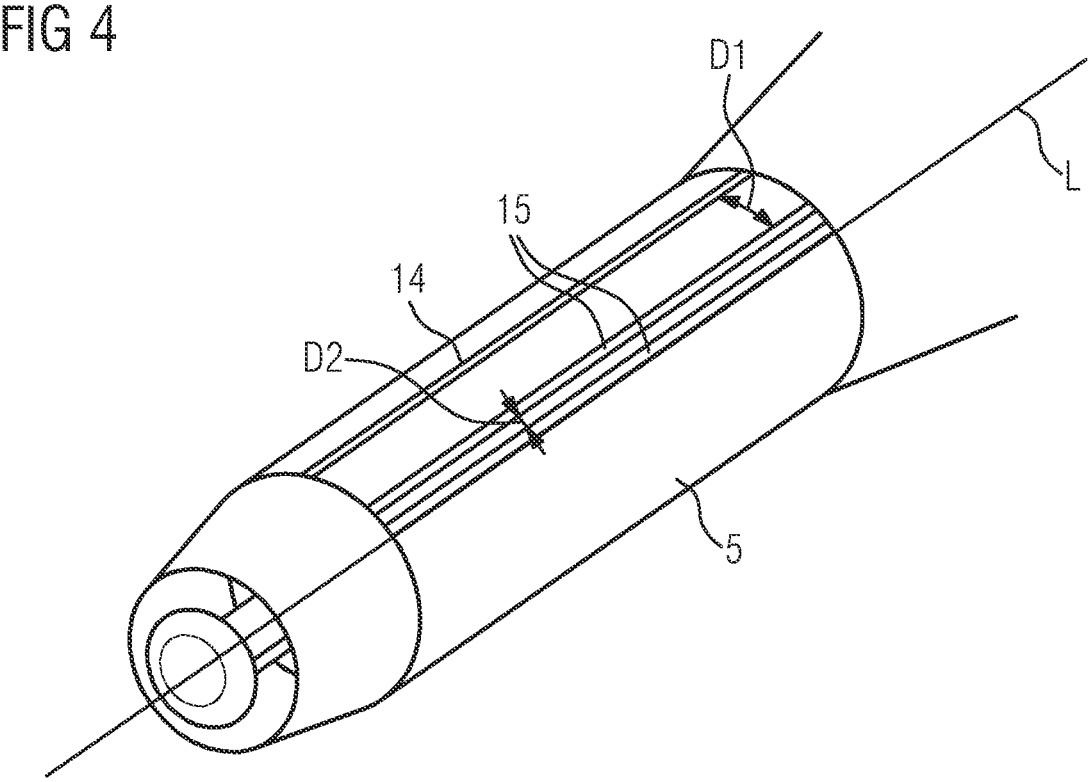
FIG. 4 is an enlarged, perspective view of a section of the guided missile in the region of the radar sensor unit.

FIG. 4 shows an enlarged section of the guided missile 1 in the region of the radar sensor unit 2. Specifically, FIG. 4 shows the region of the guidance section 5 with a radar antenna group fitted to the perimeter thereof. The radar antenna group contains a transmitting antenna 14 and two receiving antennas 15 assigned to the transmitting antenna 14.

The radar sensor unit 2 shown in FIG. 1 contains multiple such radar antenna groups, FIG. 4 showing just one radar antenna group for reasons of clarity. There may therefore be multiple radar antennas 7 and radar antenna groups on the circumferential surface of the guidance section 5, e.g. according to an evenly distributed arrangement in the circumferential direction. By way of example a total of four such radar antenna groups may be arranged in a manner distributed over the perimeter of the guidance section 5, at approximately identical intervals in the circumferential direction.

The transmitting antenna 14 and receiving antennas 15 have an elongate shape as seen in the missile longitudinal axis L, i.e. they are each in strip-shaped form. A strip-shaped radar antenna 7 can have a ratio of length to width in the range from 30:1 to 40:1, for example.

The transmitting antenna 14 and the receiving antennas 15 are of substantially identical length with respect to the missile longitudinal axis L. The beginnings and ends are each situated in planes that run at right angles to the missile longitudinal axis L. In particular the transmitting antenna 14 and the receiving antennas 15 in the example shown have substantially no offset in the direction of the missile longitudinal axis L. As already discussed above, selected radar antennas 7 may be offset in the direction of the missile longitudinal axis L, for example in order to prevent crosstalk by radar signals.

The strip-shaped transmitting antenna 14 and the strip-shaped receiving antennas 15 are in the form of leaky wave antennas in the present example.

Other types of antenna that, like leaky wave antennas, allow the antenna main lobe 8 to be aligned in the polar angle direction are also possible, however. Phase-controlled group antennas, which allow alignment of the antenna main lobe by means of appropriate adjustment of the phases of the antenna elements of the group antenna, may be mentioned in this context by way of illustration.

Leaky wave antennas allow the alignment of the antenna main lobe 8 to be adapted by varying the frequency, for example. The leaky wave antennas may be implemented as substrate-integrated leaky wave antennas, for example.

The number of radar antennas in a radar antenna group may differ from the example shown. In particular a radar antenna group can comprise more than just one transmitting antenna. Furthermore, it is possible for just one receiving antenna or more than two receiving antennas to be assigned to a radar antenna group.

In some variants it is also possible for a radar antenna 7 to be configured for selective operation as a transmitting antenna 14 and a receiving antenna 15. By way of example a corresponding radar antenna 7 may be configured such that it is alternately connectable as a transmitting antenna 14 and a receiving antenna 15. Furthermore, it is possible for the selective operation of the radar antenna 7 as a transmitting antenna 14 and a receiving antenna 15 to be implemented using a radio-frequency transmission/reception selector, for example a circulator or a coupler.

In the case of such variants with selective operation of a radar antenna 7 it is possible for the number of radar antennas to be reduced and for the radar sensor unit to be changed over between transmission and reception mode by means of appropriate operation.

Furthermore, it is possible for different radar antenna groups to be arranged in the circumferential direction, for example containing just one—or else multiple—reciprocally operable radar antennas or containing one or more radar antennas configured explicitly as transmitting antennas and one or more radar antennas configured as receiving antennas. Moreover, it is possible for the relative arrangement of the radar antennas to differ from the arrangement shown in FIG. 4. Furthermore, multiple radar sensor units 2 may be present on the missile body, for example at different positions in the direction of the missile longitudinal axis L.

The transmitting antenna 14 is at a first distance D1 from the receiving antennas 15 in the circumferential direction, and the receiving antennas 15 of the radar antenna group are at a second distance D2 from one another measured in the circumferential direction. The second distance D2 may be for example shorter than, identical to or greater than a radar wavelength at which the radar sensor unit 2 is operated. The second distance D2 is preferably in the order of magnitude of the radar wavelength. The second distance D2 may be shorter than, identical to or greater than the first distance D1, depending on the variant of the radar antenna group. By way of example, the second distance D2 may be chosen to be greater than the first distance D1 if such spacing is required in order to reduce crosstalk between the radar antennas 7. The first and second distances D1 and D2 actually shown in the figures are therefore intended to be understood merely as non-limiting exemplary embodiments.

Figure 5:
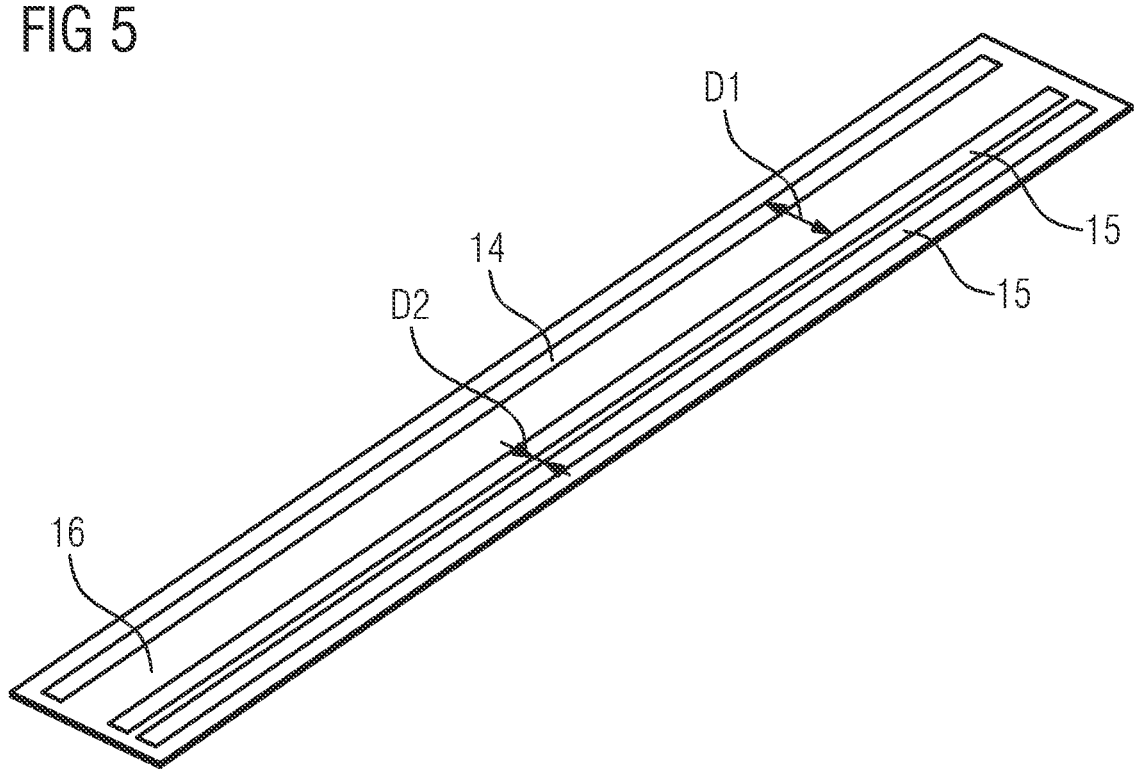
FIG. 5 is a perspective view of a radar antenna group from FIG. 4 shown in detail.

FIG. 5 shows the radar antenna group of FIG. 4 in detail. The transmitting antenna 14 and the two receiving antennas 15 are mounted or integrated on or atop a support plate 16. The support plate 16 may be configured such that it can be mounted on the outside of an outer wall of the guided missile such that the transmitting antenna 14 and the receiving antennas 15 are oriented towards the outside. The support plate 16 may also be configured such that it forms part of the outer cover, i.e. part of the outer skin, of the guided missile 1 after being mounted on the missile body.

On the side of the support plate 16 that is remote from the transmitting antenna 14 and the receiving antennas 15 there may be respective connection interfaces for the transmitting antenna 14 and the receiving antennas 15, by which the transmitting and receiving antennas 14, 15 can be connected for signal transmission and control purposes to an electronics unit configured for operating the radar sensor unit 2. The support plate 16 can in particular act as a cover for the electronics unit 17 arranged beneath it in the missile body (FIG. 3). The electronics unit 17 arranged inside the missile body schematically in FIG. 3 is connected to the radar antennas 7 via radio-frequency cables 23.

Figure 6:
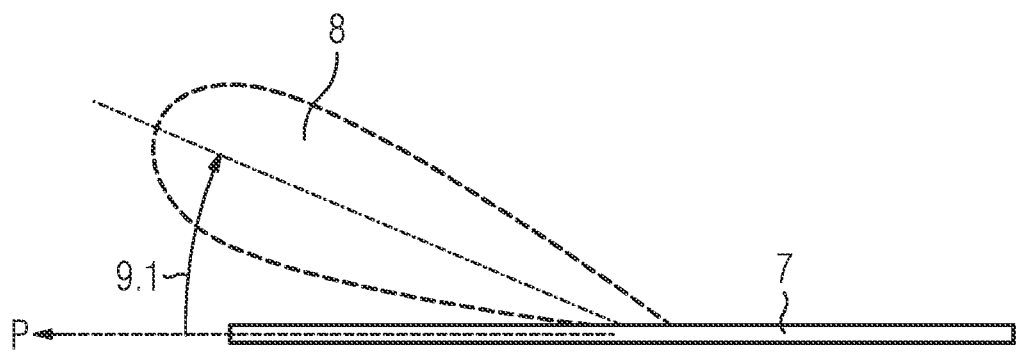
FIG. 6 is an illustration of an antenna radiation pattern of an individual radar antenna in a first mode of operation.
Figure 7:
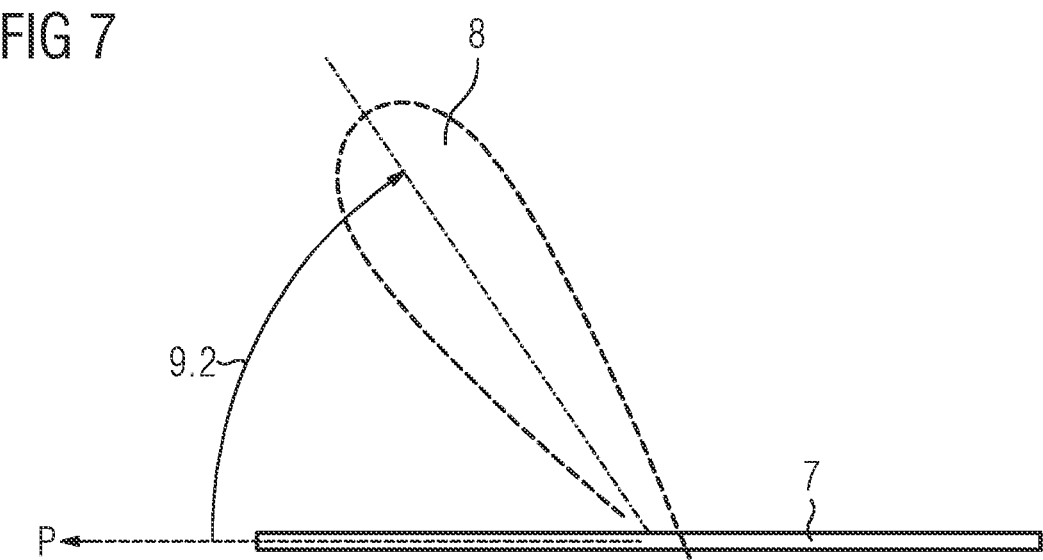
FIG. 7 is an illustration of an antenna radiation pattern of an individual radar antenna in a second mode of operation.

FIG. 6 shows an antenna radiation pattern of an individual radar antenna 7 in a first mode of operation, and FIG. 7 shows an antenna radiation pattern of an individual radar antenna 7 in a second mode of operation. The radar antennas 7 are in the form of strip-shaped leaky wave antennas.

In the first mode of operation of FIG. 6 the radar antenna 7 is operated at a first frequency and has an antenna main lobe 8 at a first polar angle 9.1.

In the second mode of operation of FIG. 7 the radar antenna 7 is operated at a second frequency and has an antenna main lobe 8 at a second polar angle 9.2.

The first polar angle 9.1 is smaller than the second polar angle 9.2, as can be seen by looking at FIG. 6 and FIG. 7 together. When using corresponding radar antennas 7 as transmitting antennas 14 it is therefore possible to swivel the antenna main lobe 8. On the basis of a swivel of the antenna main lobe 8 it is possible to ascertain in particular the polar angle of a target object 11 situated in the field of view of the radar sensor unit 2 from the respectively captured reflected radar signals.

In particular the polar angle of a target object 11 situated in the field of view can be ascertained by means of amplitude comparison of the reflected radar signals. By way of example that polar angle of a radiated radar signal whose reflected radar signals show an amplitude maximum in the amplitude comparison can be used as a polar angle of the target object 11.

Figure 8:
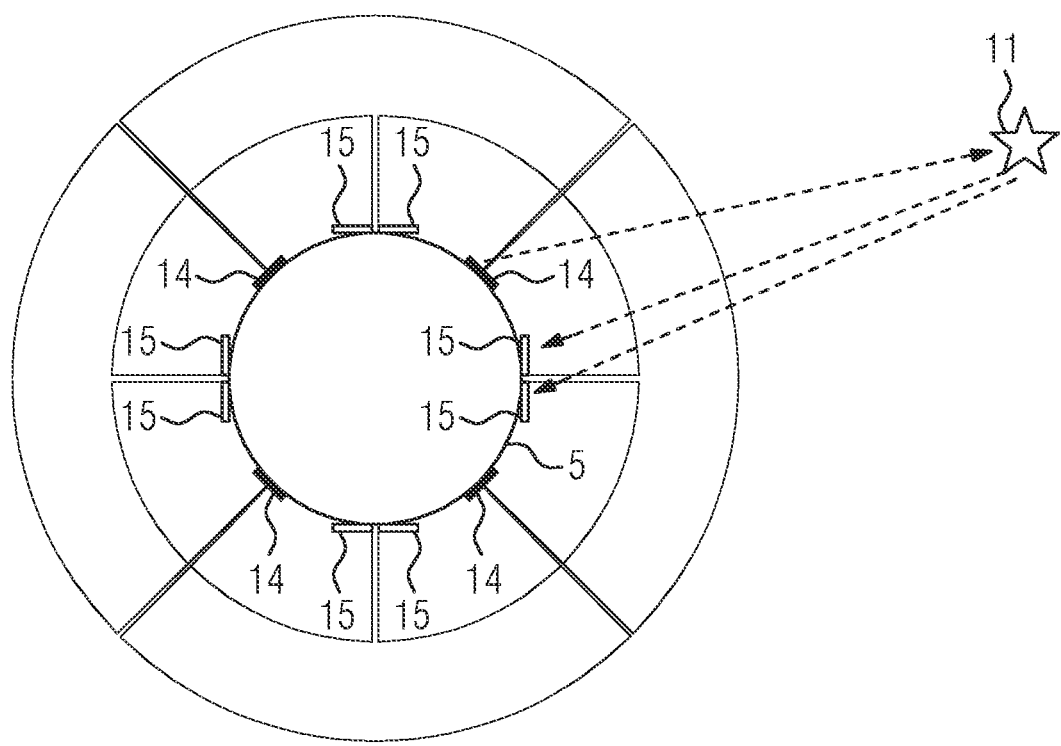
FIG. 8 is a schematic cross-sectional view of the missile in the region of the radar sensor unit.

FIG. 8 shows a schematic cross-sectional view of the guided missile 1 in the region of the guidance section 5, the transmitting antennas 14 and the receiving antennas 15.

In the example shown in FIG. 8 a total of four of the radar antenna groups shown in FIG. 4 and FIG. 5 are arranged on the perimeter of the guidance section 5, the radar antenna groups being distributed such that they can be converted into one another by means of a rotation through an angle of 90 degrees about the missile longitudinal axis L.

The arrangement of the transmitting and receiving antennas 14, 15 shown in FIG. 8 can be used in combination to achieve a field of view that allows almost complete spatial coverage over the azimuth angle. In FIG. 8 the plane of the drawing lies in or parallel to the azimuthal main plane of the spherical coordinate system described earlier on.

In some variants the number of radar antenna groups shown in FIG. 8 can also vary and match the respective dimensions of the guided missile cross-section. With a larger diameter it may be necessary e.g. to arrange more than four radar antenna groups in order to obtain substantially complete spatial coverage over the azimuth angle. The same applies if coverage with fewer radar antenna groups is possible. If there are fewer radar antenna groups present than are required for complete coverage of the full azimuth angle, the missing coverage can be compensated for by virtue of the roll angle of the guided missile 1 changing during flight, for example, and the field of view being rotated as a result. Rotation of the field of view on the basis of adaptation of the roll angle can take place on the basis of data pertaining to prior knowledge of an approximate position of the target object 11, for example.

The arrangement of the transmitting and receiving antennas 14, 15 shown in FIG. 8 allows in particular the polar angle and the azimuth angle of a target object 11 to be ascertained.

The polar angle of a target object 11 can be ascertained, or at least narrowed down, as already described above, for example by virtue of the antenna main lobe(s) 8 of one or more radar antenna groups being swivelled over the polar angle in successive operating cycles, and the reflected radar signals of successive operating cycles being compared with one another in respect of amplitude. The polar angle of the target object 11 can then be assumed to be that polar angle at which the amplitude of a reflected radar signal is greatest, in particular has a maximum or passes through a maximum. By way of illustration, reference is made in this instance to methods described in S. A. Hovanessian, 1982, Radar Detection & Tracking Systems, ISBN 0-89006-018-5, which can be applied accordingly.

The azimuth angle of a target object 11 can be ascertained for example by virtue of radar signals radiated by a transmitting antenna 14 in an operating cycle and reflected by the target object 11 being simultaneously detected by adjacent receiving antennas. Phase and amplitude comparison of the simultaneously detected reflected radar signals can then be used to ascertain the azimuth angle of the target object 11. By way of example, reference is made in this instance to methods described in David K. Barton, 1985, Radar System Analysis, ISBN 0-89006-043-6, which can be applied accordingly.

Suitable search strategies for operating the radar sensor unit 2 may be implemented in order to ascertain the polar angle and azimuth angle of the target object 11.

The distance of the target object 11 can be ascertained by means of time-of-flight measurements, for example.

In the example shown in FIG. 8 the azimuth angle of the schematically depicted target object 11 can be ascertained by virtue of the transmitting antenna 14 situated at the top left transmitting a radar signal and reflected radar signals being received, in particular simultaneously detected, by the receiving antennas 15 assigned to the radar antenna group, this being indicated schematically by dashed arrows in FIG. 8. The azimuth angle of the target object 11 can then be ascertained from amplitude and/or phase comparison of the simultaneously detected, reflected radar signals.

However, receiving antennas 15 of a different, adjacent radar antenna group can also be used to ascertain the azimuth angle of the target object 11. If the target object 11 in the example of FIG. 8 is located in the region above the transmitting antenna 14 situated at the top right, for example, the receiving antennas 15 and corresponding received signals of the radar antenna group situated adjacently anticlockwise in FIG. 8 can be used.

Figure 9:
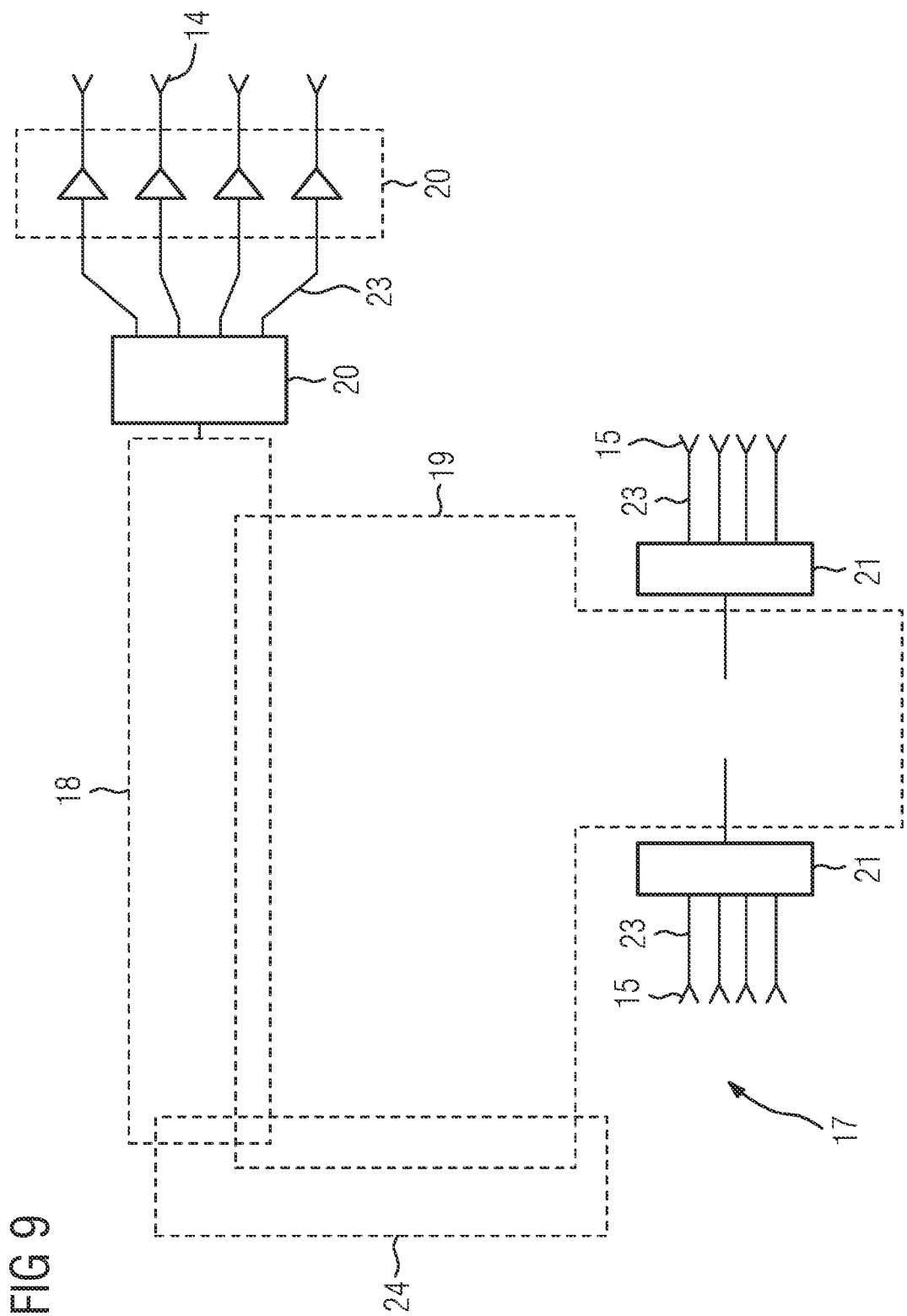
FIG. 9 is a circuit arrangement of the radar sensor unit.

FIG. 9 shows a circuit arrangement, in particular an electronics unit 17, for operating the radar sensors 7 to acquire a target object 11 by way of illustration.

The electronics unit 17 contains a transmitting channel 18 and two receiving channels 19, the transmitting channel 18 and the two receiving channels 19 being depicted schematically by dashed rectangles in FIG. 9.

The transmitting channel 18 in the version shown can be connected to one or more of the four transmitting antennas 14 by means of a switching network 20, said transmitting antennas being connected to the electronics unit 17 via radio-frequency cables 23.

The electronics unit 17 also contains two receiving channels 19, each receiving channel being able to be connected to one or more of in each case four receiving antennas 15 by means of further switching networks 21. The receiving antennas 15 are connected to the electronics unit 17 via radio-frequency cables 23.

In order to acquire a target object 11, i.e. in order to detect and locate a target object 11, the transmitting antennas 14 and receiving antennas 15 can be activated in respective operating cycles in the manner described above. An evaluation unit 24, which is depicted schematically by a dashed rectangle in FIG. 9, of the electronics unit 17 can evaluate the radar signals captured by the receiving antennas 15 and can accordingly use them to ascertain target object data, for example to ascertain the distance, polar angle, azimuth angle, velocity and/or acceleration of the target object 11.

If it is not possible to detect a target object 11 in an operating cycle, for example, one or more other transmitting antennas and/or other receiving antennas can be activated in a subsequent operating cycle, and received radar signals can be evaluated to ascertain whether a target object 11 is located in the respective field of view. Accordingly, transmitting and receiving antennas can be activated to ascertain the polar angle and azimuth angle and other target object data.

Figure 10:
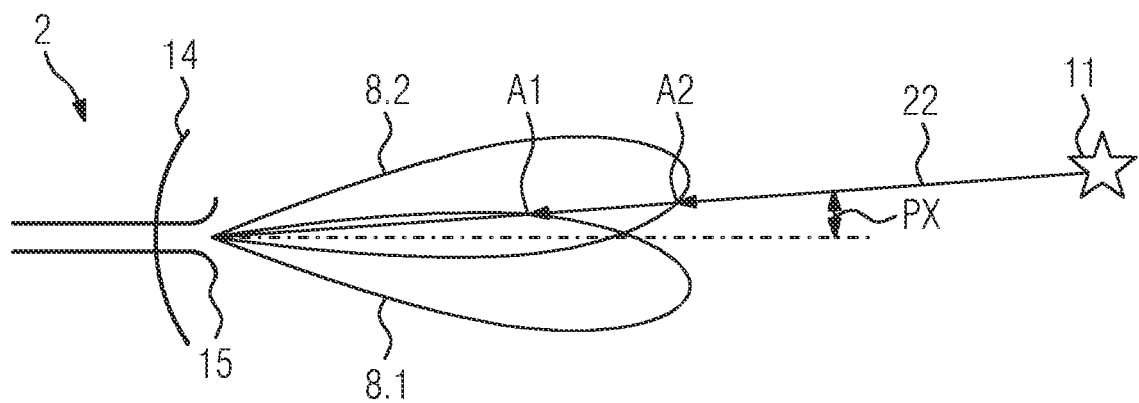
FIG. 10 is an illustration showing the operation of the radar sensor to ascertain the polar angle of a target object by way of illustration.

FIG. 10 shows the operation of the radar sensor unit 2 to ascertain the polar angle of a target object 11 by way of illustration and schematically. Specifically, the radar sensor unit 2 is operated with antenna main lobes 8 aligned differently over the polar angle in successive operating cycles.

In a first operating cycle corresponding to a first antenna main lobe 8.1 a reflected radar signal having a first amplitude A1 is measured, the first amplitude A1 corresponding to the point of intersection on the direct connecting line 22 between the radar sensor unit 2, i.e. the receiving antenna/s 15, and the target object 11 in the depiction in FIG. 10.

In a second operating cycle corresponding to a second antenna main lobe 8.2 a reflected radar signal having a second amplitude A2 is measured, the second amplitude A2 corresponding to the point of intersection on the direct connecting line 22 between the radar sensor unit 2, i.e. the receiving antenna(s) 15, and the target object 11 in the depiction in FIG. 10.

As can be seen from FIG. 10 in a schematic depiction, the first amplitude A1 is smaller than the second amplitude A2, from which it is possible to conclude that the polar angle of the second antenna main lobe 8.2 in the second operating cycle is closer to the actual polar angle of the target object 11 than the polar angle of the first antenna main lobe 8.1 of the first operating cycle.

On the basis of multiple successive operating cycles with respective different alignments of the antenna main lobe 8 over the polar angle it is then possible to assign to the target object 11 that polar angle PX for which the amplitude of the reflected radar signal is greatest, e.g. has or passes through a maximum. FIG. 10 depicts just two operating cycles for the purposes of illustration.

FIG. 11 shows the operation of the radar sensor unit 2 to ascertain the azimuth angle AX of a target object 11 by way of illustration and schematically.

In this case, radar signals radiated in an operating cycle and reflected by the target object 11 are simultaneously detected by adjacent receiving antennas 15. At least one phase difference in the received reflected radar signals is obtained on the basis of the distance AD between the receiving antennas 15 that exists in the azimuth direction.

From geometric considerations, the azimuth angle AX of the target object is obtained for example for a measured phase difference PD with a given radar wavelength I and on the basis of the distance AD between the two receiving antennas 15 from the following equation:

$$AX = inv\,\sin(I*PD/(2Pi*AD)),$$

where invsin denotes the inverse sine function and Pi denotes pi.

In regard to FIG. 1, FIG. 8, FIG. 9 and FIG. 10 it should also be mentioned that these are not to scale at least insofar as the target object 11 is much further away from the radar sensor unit 2 and the missile 1 under real conditions than depicted.

When ascertaining the target object data it is possible for the electronics unit 17, in particular the evaluation unit 24, and the radar sensor unit 2 to be operated in the manner described earlier on. In particular at least some of the operating parameters of the radar sensor unit 2 can be tailored to prior knowledge pertaining to the target object 11, for example pertaining to the position of the target object 11. By way of example the operating parameters can be adjusted to ascertain the polar angle PX of the target object 11 and/or the azimuth angle AX of the target object 11 in an initial phase of target acquisition on the basis of position data that have been/are ascertained and provided to the electronics unit 17 and evaluation unit 24 via an external unit or via a target acquisition unit other than the radar sensor unit 2, which target acquisition unit may be optical or infrared-based, for example. As soon as the target object 11 is in the field of view of the radar sensor unit 2 and is acquired, the operating parameters can be adapted on the basis of the received signals of the radar sensor unit 2, for example in order to set a suitable polar angle for the antenna main lobe 8 and/or to activate suitable radar sensor groups to acquire the target object 11 in the azimuth direction, such that the target object 11 can be tracked on the basis of the radar sensor unit 2 and remains in the field of view of the radar sensor unit 2.

According to some variants the radar sensor unit 2 contains strip-shaped individual radar antennas 7 in a parallel arrangement that are disposed along the missile longitudinal axis L on the surface of the cylindrical housing of the guidance section 5 of the missile 1 or, in the more general case, along the missile longitudinal axis L on a relatively narrow and long planar surface. The second distance D2 between adjacent receiving antennas 15 and the first distance D1 between the transmitting antennas 14 and the receiving antennas can be in the ranges already described earlier on.

In some variants the radar sensor unit 2 can contain at least one transmitting antenna 14 and two receiving antennas 15, but a larger number of transmitting antennas 14 and receiving antennas 15 may also be present in each case, e.g. one transmitting antenna 14 and a series of three or more adjacent receiving antennas 15 within a radar antenna group.

When using circulators and suitable distribution networks, in particular transmission/reception selectors, the transmitting and receiving antennas 14, 15 may be identical in some variants.

In some variants the strip-shaped radar antennas 7 have an antenna radiation pattern able to be directed over the polar angle whose 3-dB antenna main lobe width over the polar angle measures only comparatively few degrees but stretches from the middle of the two-digit to the low three-digit range of degrees over the azimuth angle.

The polar angle range over which the antenna radiation pattern of a strip-shaped radar antenna 7 is able to be directed and the 3-dB antenna main lobe widths of the antenna radiation pattern for the different alignments determine the spatial segment that can be illuminated by the radar antenna 7 and in which target objects 11 can be acquired.

In general, an antenna arrangement containing a transmitting antenna 14 with two or more adjacent receiving antennas 15 cannot definitely cover the entire space. In order to be able to capture larger spatial segments there may be provision for further antenna arrangements that are of the same type but point in different azimuth directions, e.g. radar antenna groups. A sufficiently large number of antennas can therefore be used to cover the space for substantially all azimuth angles. Gaps in the spatial coverage may remain only as a result of the limits of the directability of the antenna radiation patterns over the polar angle.

In some variants the electronics unit 17 contains one or more transmitting channels 18 for generating radar signals that are radiated or transmitted via connected transmitting antennas 14, and two or more receiving channels 19 for detecting radar signals reflected by a target object 11 that are then received via the connected receiving antennas 15.

In some variants the electronics unit 17 contains at least one transmitting channel 18 and two receiving channels 19 that are connected or can be connected to a corresponding number of transmitting and receiving antennas 14, 15. For more extensive antenna arrangements one transmitting channel 18 may be distributed over or connectable to all transmitting antennas 14, or else there may be provision for one transmitting channel 18 per transmitting antenna 14.

In some variants there is provision for a separate receiving channel 19 for each receiving antenna 15 in a series of adjacent receiving antennas 15 so that in particular phase and amplitude differences in simultaneously received radar signals can be evaluated to ascertain the azimuth angle AX of the target object 11.

If, according to some variants, the antenna arrangement consists of multiple homogeneous series or groups of adjacent receiving antennas 15 that are e.g. aligned in different azimuth directions, some variants allow the number of receiving channels 19 to be reduced to the number of receiving antennas 15 in a series or group of adjacent receiving antennas 15, with the receiving channels 19 being connected to that series or group of adjacent receiving antennas 15 that is currently intended to be used to receive.

If corresponding variants require switching to be effected between a few transmitting and receiving channels 18, 19 and many transmitting and receiving antennas 14, 15 then it may be possible not to use all of the transmitting antennas 15 for transmission or all of the receiving antennas 14 for reception in parallel. Accordingly, the target object 11 can be acquired only in the spatial segment that is respectively covered by the activated transmitting and receiving antennas 14, 15.

Successful detection and location of target objects 11 in a spatial segment by the radar sensor unit 2 requires the antenna main lobes 8 of the transmitting and receiving antennas 14, 15 that cover this spatial segment to be aligned with the target object 11 over the polar angle, for example by using possibly available prior knowledge of the approximate position of the target object 11 or as part of a search strategy that involves a spatial segment being progressively searched or scanned for possible target objects 11.

If the target object 11 is within the antenna main lobes 8 then it can be detected in the different connected receiving channels 19. According to some variants its position in spherical coordinates can be measured as follows:

) The polar angle can already be obtained relatively accurately by virtue of the target object 11 being in the antenna main lobe 8 of the transmitting and receiving antennas 14, 15 that is comparatively narrow over the polar angle. For more accurate measurement the alignment of the antenna main lobe 8 is varied between chronologically successive detections, for example slightly or progressively iteratively. Amplitude comparison of the different detections allows comparatively accurate location of the target object 11 to be achieved.

b) The azimuth angle can be estimated only very coarsely using the mere knowledge that the target object 11 is within the antenna main lobe 8 that is comparatively wide over the azimuth angle. It can be accurately measured and ascertained by means of phase and amplitude comparison of simultaneous detections by adjacent receiving antennas 15.

c) The distance and approach velocity of the target object 11 can be obtained from the received radar signal when a suitable form of modulation for the transmitted radar signal is chosen, for example.

The explanations above reveal in particular that the proposed radar sensor unit on a missile allows comparatively precise ascertainment of target object data. Furthermore, it is possible to functionalize the missile tip usually fitted with seeker optical systems or other target acquisition units in another way.

REFERENCE SIGNS 1 guided missile
2 radar sensor unit
3 drive
4 missile head
5 guidance section
6 warhead
7 radar antenna
8 antenna main lobe
8.1 first antenna main lobe
8.2 second antenna main lobe
9 polar angle
9.1 first polar angle
9.2 second polar angle
10 azimuth angle
11 target object
12 polar vertex angle
13 azimuth vertex angle
14 transmitting antenna
15 receiving antenna
16 support plate
17 electronics unit
18 transmitting channel
19 receiving channel
20 switching network
21 further switching network
22 connecting line
23 radio-frequency cable
24 evaluation unit
AE drive end
A1 first amplitude
A2 second amplitude
D1 first distance
D2 second distance
E plane
H front half-space
KE head end
L missile longitudinal axis
I radar wavelength
M centre axis
P polar axis
PX target object polar angle
PD phase difference
AX target object azimuth angle
AD distance between the receiving antennas

The invention claimed is:

1. A missile, comprising:
a missile body having a circumferential surface; and
a radar sensor unit for acquiring a target object, said radar sensor unit configured to emit radar signals having at least one stipulated radar wavelength, said radar sensor unit having at least two strip-shaped radar antennas being strip-shaped in a longitudinal direction, and mounted or integrated on said circumferential surface of said missile body such that the longitudinal direction of each of the at least two strip-shaped radar antennas is aligned in a direction of a missile longitudinal axis;
said at least two strip-shaped radar antennas configured for operation as a transmitting antenna for transmitting radar signals and/or for operation as a receiving antenna for receiving reflected radar signals;
said at least two strip-shaped radar antennas mounted or integrated on said circumferential surface of said missile body and disposed to be aligned substantially parallel to one another;
said radar sensor unit including at least one radar antenna group having said at least two strip-shaped radar antennas, wherein said at least one radar antenna group includes:
a) a first radar antenna configured for operation as a transmitting antenna, and at least one second radar antenna assigned to said first radar antenna and configured for operation as a receiving antenna for receiving reflected radar signals; and
b) at least two directly adjacent strip-shaped radar antennas configured at least for operation as receiving antennas, wherein a distance between said at least two directly adjacent strip-shaped radar antennas, transversely with respect to the longitudinal direction of said at least two directly adjacent strip-shaped radar antennas, is shorter than the stipulated radar wavelength;
wherein said at least two directly adjacent strip-shaped radar antennas are said at least one second radar antenna, assigned to said first radar antenna, and a further radar antenna at least configured for operation as a receiving antenna for receiving reflected radar signals.

2. The missile according to claim 1, wherein one of said at least two strip-shaped radar antennas is mounted or integrated such that the longitudinal direction of said one of said at least two strip-shaped radar antennas and the missile longitudinal axis span a plane.

3. The missile according to claim 1, wherein said at least one radar antenna group is one of a plurality of radar antenna groups disposed in a manner distributed over a circumference of said missile body, and said plurality of antenna groups are disposed in an evenly distributed manner and/or in a manner distributed according to a stipulated symmetry over the circumference of said missile body.

4. The missile according to claim 1, wherein:
said missile body has a missile tip; and
at least one of said at least two strip-shaped radar antennas is configured and operable to have an antenna radiation pattern that is able to be directed over a polar angle, the polar angle is defined with respect to a spherical coordinate system with a positive polar axis that runs in a direction of the missile longitudinal axis.

5. The missile according to claim 4, wherein the antenna radiation pattern of Is at least one of said at least two strip-shaped radar antennas has an antenna main lobe focused over a polar vertex angle that is less than or equal to 30 degrees, and wherein the antenna main lobe sweeps over an azimuth vertex angle that is equal to or greater than 30 degrees.

6. The missile according to claim 4, wherein at least one of said at least two strip-shaped radar antennas is in a form of a radar antenna that is alignable over the polar angle by means of frequency or phase.

7. The missile according to claim 4, wherein: at least one of said at least two strip-shaped radar antennas is configured as a leaky wave antenna.

8. The missile according to claim 4, wherein: each one of said at least two strip-shaped radar antennas is one of a plurality of radar antennas configured as phase-controlled group antennas.

9. The missile according to claim 1,
wherein said at least one strip-shaped radar antenna is one of a plurality of antennas;
further comprising an electronics unit having reception electronics and transmission electronics for said radar sensor unit, said electronics unit is connectable or connected to said radar sensor unit for data transmission purposes in order to operate said radar sensor unit, said electronics unit having at least one electronic component configured such that during an operation of said electronics unit said electronics unit operates said at least one strip-shaped radar antenna as a transmitting antenna and/or a receiving antenna;
wherein a transmitting channel of said transmission electronics of said electronics unit is connected to said at least one strip-shaped radar antenna operable as said transmitting antenna, wherein a receiving channel of said reception electronics of said electronics unit is connected to said at least one strip-shaped radar antenna operable as said receiving antenna, wherein said radar antennas operable as said transmitting antennas and said radar antennas operable as said receiving antennas are connected to the transmitting and receiving channels, and wherein said radar sensor unit is operable with an antenna object.

10. The missile according to claim 9, wherein said electronics unit has at least one said transmitting channel, and wherein said electronics unit has at least one said receiving channel, wherein said electronics unit is configured to connect said at least one transmitting channel to one of said radar antennas operable as the transmitting antenna and operable with the antenna main lobe that is alignable in a direction of the target object and to connect said at least one receiving channel to a radar antenna operable as said receiving antenna in order to capture the radar signals reflected by the target object.

11. The missile according to claim 10, wherein said at least one said receiving channel is one of at least two receiving channels.

12. The missile according to claim 1, wherein said circumferential surface is in substantially planar form in the longitudinal direction of at least one of said at least two strip-shaped radar antennas.

13. The missile according to claim 1, wherein said circumferential surface is in cylindrical or conical form with respect to the missile longitudinal axis.

14. The missile according to claim 1, wherein the missile is a guided missile.

* * * * *